Aug. 9, 1966

C. E. HENDRICKS 3,264,932

METHOD AND DEVICE FOR PRESENTING A VISUAL COMPARISON OF TWO
DIFFERENT CURVED SURFACES

Filed May 27, 1964

INVENTOR.
CHARLES E. HENDRICKS
BY
Head & Johnson
ATTORNEYS

United States Patent Office 3,264,932
Patented August 9, 1966

3,264,932
METHOD AND DEVICE FOR PRESENTING A VISUAL COMPARISON OF TWO DIFFERENT CURVED SURFACES
Charles E. Hendricks, 5500 E. 51st St., Tulsa, Okla.
Filed May 27, 1964, Ser. No. 370,490
6 Claims. (Cl. 88—24)

This invention relates to a method of presenting a visual comparison of two different curved surfaces. In one of its applications, the invention relates to a method of comparing the curvature of the exterior corneal surfaces of an eyeball with a spherical surface of known but variable radius. In the application of such a method this invention is highly useful in predicting the points of contact of a contact lens of a given radius of curvature and diameter with the exterior corneal surface of an eyeball. In addition, this invention relates to a device for presenting a visual comparison of two different reflective curved surfaces, the device being particularly useful for visually predicting the points of contact of a contact lens with the corneal surfaces of an eyeball.

Although contact lenses for correction of vision are in common usage, the widespread use of contact lenses has been limited by their relatively high expense compared with eyeglasses. One of the prime factors causing the relatively high expense of contact lenses is the time required for determining the proper radius of curvature and the diameter of the required contact lens for each eye of a patient.

Some instruments have been developed for determining the shape of the corneal surfaces of an eyeball. The most common method of determining the exterior shape of an eyeball is by means of Keratoscope. The Keratoscope provide a photograph of the eyeball including the reproduction of concentric rings of light cast onto the eyeball. By measuring the distance between the rings of light at various points the curvature measurements between the rings can reveal the radius of each portion of the eyeball. While such measurements can, with sufficient time and a sufficiently large number of readings, provide a fairly accurate contour of the cornea the relatively large amount of time consumed is as above mentioned, a factor in making contact lenses economically prohibitive to many people.

It is an object of this invention to provide a method of presenting a visual comparison of two different reflective curved surfaces and, in one important exemplification of the application of the method of this invention, to provide a method of predetermining the points of contact of a contact lens of given diameter and radius of curvature with the exterior corneal surface of an eyeball.

Another object of this invention is to provide a device for presenting a visual comparison of two different reflective curved surfaces.

Another and more specific object of this invention is to provide a device for visually illustrating the exterior configuration of the corneal surface of an eyeball and comparing such surface with that of a spherical surface of known but variable radius.

These and other objects, will be fulfilled and a better understanding of the invention may be had by referring to the following description and claims taken in conjunction with the attached drawings in which:

This invention may be described as a method of presenting a visual comparison of two different reflective curved surfaces. More particularly, but not by way of limitation, the invention may be described as a method of presenting a comparison of two different reflective curved surfaces comprising displaying on a screen a target having the form derived from the reflection of concentric light rings from the first reflective surface, displaying on said screen projected reflected concentric light rings from a second reflective surface, and varying the magnification of said projected light rings relative to said displayed target.

Figure 1:
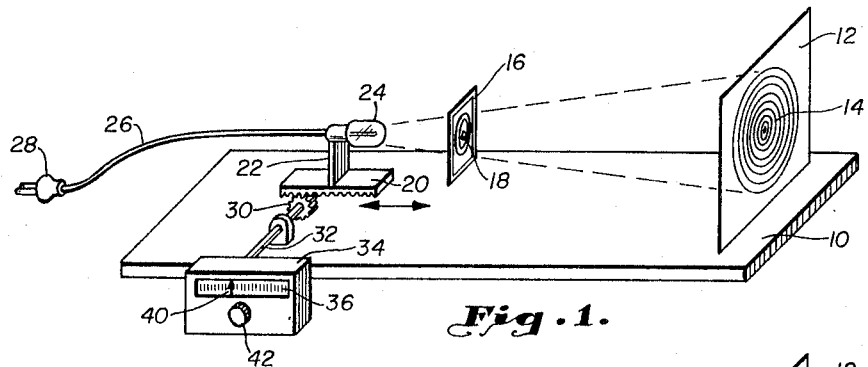
FIGURE 1 is a schematic view of a device for carrying out the method of this invention.

Referring now to the drawings and first to FIGURE 1 a device useful to employ the methods of this invention is disclosed. Mounted on a base 10 is an upstanding screen 12. Imprinted on the screen 12 is a target 14 which consists of a series of concentric rings. The method of deriving the target 14 will be described subsequently.

Supported on base 10 in a plane parallel the target 14 and at a fixed distance spaced from screen 12 is a photographed holder member 16. Removably positioned in the photograph holder 16 is a photograph 18 which, according to one application of this invention, is preferably a photographic negative made of reflected concentric rings of light from the exterior corneal surface of an eyeball.

Movably positioned on the base 10 is a light support base 20 supporting, by upstanding post 22, a point light source 24. Conductors 26 extending to an electrical plug 28 provide a means of electrically energizing the light source 24.

Light support base 20, as was previously mentioned is slideably or movably supported relative to base 10, such as by means of a ratchet gear 30 affixed to a drive shaft 32 which in turn is rotatably controlled by a calibrating indicating device 34. The calibrating indicating device 34 includes a scale 36, a pointer 40 and a control knob 42. Through a gearing arrangement in the calibrating indicator 34 (the detail of which is not shown since such is within the skill of any mechanic) the manual rotation of knob 42 rotates the shaft 32 to move light source 24 toward or away from the photograph holder 16. Pointer 40 is coupled to the rotation of knobs 42 and shaft 32 to calibrating indicator on scale 36 the distance from the light source 24 to the negative 18 in terms of the relative magnification of the projection of negative 18 onto screen 12 compared to the target 14.

Figure 5:
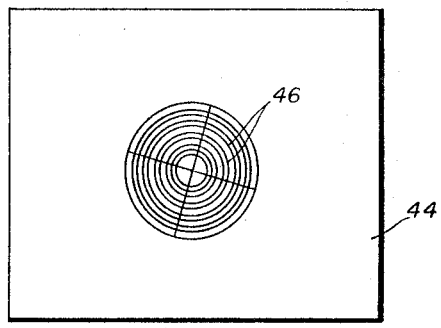
FIGURE 5 is a view of a negative made by a Keratoscope of a spherical reflective surface as utilized to imprint a target on the screen member of the invention.

FIGURE 5 shows a photographic negative made by means of a Keratoscope or some similar optical device by the reflection of concentric rings of light from a spherical reflective surface. Typically, the reflection of concentric light rings from a steel ball of known radius is photographed. The photographic negative of FIGURE 5 can be utilized to provide the target 14 on screen 12 as shown in FIGURE 1. One method includes the printing of an enlarged photograph made from the photographic negative of FIGURE 5. The enlarged photograph can then be utilized as the target 14 of screen 12.

Figure 6:
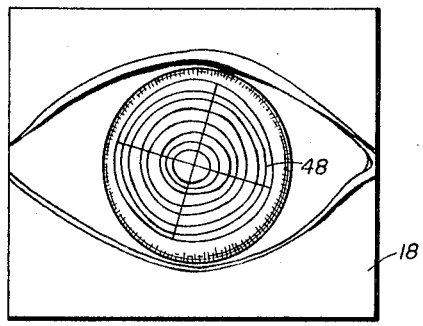
FIGURE 6 is a view of a photographic negative of the corneal surface of an eyeball as made such as by means of a Keratoscope.

FIGURE 6 shows a photographic negative made by means of a Keratoscope or the like showing reflected concentric rings of light from the exterior corneal surface of an eyeball. Whereas the photographic negative of FIGURE 5 is made from a reflective surface of known radius, the radius of the corneal surface shown in the photographic negative of FIGURE 6 is not known.

Figure 7:
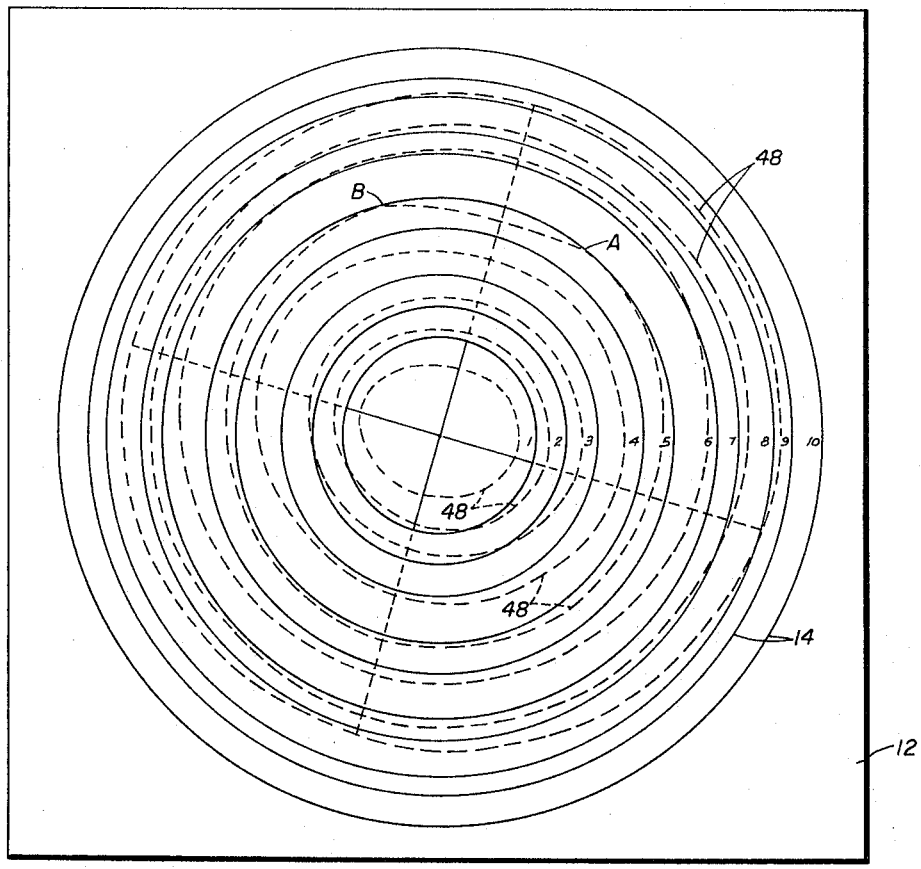
FIGURE 7 is a view of the screen of this invention showing the target on the screen having a form derived from the reflection of concentric light rings from a spherical surface of known radius and showing displayed thereon projected reflected concentric light rings from the corneal surface of an eyeball as obtained from the negative of FIGURE 6.

FIGURE 7 discloses a view of screen 12, and target 14, with the reflected rings of light from the exterior corneal surface of an eyeball projected onto the screen by means of the use of the negative 18 of FIGURE 6.

It may be seen that FIGURE 1 is basically a photographic projector with three special characteristics. First, a screen 12 is provided having a scaled target 14. Second, a point light source 24 is provided such that magnification may be adjusted without change of focus by moving the light source relative to a photograph holder 16. Third, an accurate calibration of the magnification of the projection of negative 18 supported by photograph holder 16, as projected on the screen 12, is readable on the scale 36.

The calibration of the scale 36 may be done mathematically or by projecting pictures of concentric light ring reflections from spheres of known radii. For instance, the radius of curvature of the corneal surface of a human eyeball usually falls between 5 and 10 millimeters. If a photograph is made of reflected concentric rings of light of a spherical ball, such as a reflective metal sphere, of 7.5 millimeters radius, such photograph may be magnified and used for the target 14 of screen 12. With the same photograph negative of the 7.5 millimeter spherical surface placed in photographic holder 16, knob 42 may be adjusted to vary the distance of light source 24 from photograph holder 16 until the projected image matches the target 14. The position which pointer 40 points on scale 36 can then be marked "7.5," indicating that at this position the photograph negative 18 shows concentric light rings from a spherical surface of 7.5 millimeters. Next, a photographic negative 18 having thereon reflections of concentric rings of light from a sphere of 10 millimeters radius can then be projected onto screen 12 and knob 40 rotated until the proper distance between the light source 24 and the photographic holder 16 is achieved wherein the projected image matches the target 14. The scale 36 may then be marked 10 millimeters at the point indicated by pointer 40. The same procedure may then be repeated utilizing a photographic negative 18 of reflected concentric rings of light from a spherical reflective surface of 5.0 millimeters and the scale 36 marked at the proper place. This gives a scale 36 with three calibrated points. The scale may then be divided between such points as many times as is required to provide a suitable continuous scale. It should be noted that the scale 36 is now calibrated directly in millimeters of radius of curvature. To determine the radius of a spherical surface utilizing the method of this invention the first step is to take a photograph of reflected rings of light from the surface using the same instrument or one having duplicate optical properties as was utilized to make the photographic negative utilized to calibrate the instrument. The photographic negative of the sphere of unknown radius may then be placed in photographic folder 16 and knob 42 rotated until the projected image matches target 14. The radius of the spherical surface may then be read directly on scale 36.

As has been previously indicated, this invention may be utilized to determine the radius of curvature of any spherical reflective body. Of course, when spherical objects, such as steel balls are in question, it is a simple matter to determine the radius directly by physical measurement. A different situation exists however with reference to the exterial surface of an eyeball. In order to properly fit a contact lens it is necessary not only for the fitter to determine the basic radius of curvature of the portion of the eye to be covered with the contact lens, but in addition, to know beforehand the points of contact which will exist between the lens and the surface of the eyeball. The human eye is almost never perfectly spherical. On the other hand the eye is composed of many curves with no two eyes exactly the same.

Referring to FIGURE 7 an example of the application of the device in this invention for fitting contact lens is best shown. The screen 14 is provided with scale 12 such as by means previously described. Concentric rings 14 composing the scale are each of a known diameter as reflected from a perfectly spherical object. The dotted lines 48 represent the projected rings of light as reflected from the exterior corneal surface of an eyeball. With the projection of the rings 48 on screen 12 the operator can visually determine the points of contact with the eyeball by contact lens of various radii. By turning knob 42 (FIGURE 1) all of the various possible radii of curvature of contact lens may be visually compared to the eye on which a lens will be applied. Further, by observing the screen 12 the points of contact of lenses of various diameters can be predicted to enable the operator not only to select the proper radius of curvature but the proper diameter of lens for a patient.

In FIGURE 7, with the radius of curvature as would indicate on dial 36 of FIGURE 1, it can be seen that a contact lens of such curvature would contact the corneal surface at approximately the diameter of ring 5. It is noted that the contact of lens of this diameter occurs in the upper right and left hand corners at points A and B. One method of fitting contact lenses requires contacts of the lens with the upper nasal and temporal portions of the corneal surface with the lower periphery of the lens positioned from the corneal surface. This permits fluid to flow under the lens. It will be noted in FIGURE 7 that the concentric rings 48 reflected from the corneal surface of the eye under study corresponding to rings 1, 2, 3 and 4 of the target are all of smaller diameter. This indicates that a lens of the radius indicated on scale 36 would have the desired clearance of the center of the cornea area.

It can be seen that by varying the magnification of the projection of the photographic negative 18 comparison is easily made of the effect of the contact lens of different radii of curvature. By noting the areas at which the concentric rings 48 reflected from the cornea overlie the target lines 14 the most advantageous diameter of a contact lens is easily determined. In this way, both the effect of various radius of curvature and diameters of contact lens on the eye as represented by the photographic negative 18 can be easily and quickly visually determined, this enables the operator to rapidly select the proper radius of curvature and diameter of a contact lens for a patient and at the same time predict with great accuracy the specific points at which such lens will contact the eye.

In addition it can be seen that an experienced operator can determine other valuable information from the use of the device and method of this invention. For instance by varying the radius of curvature of the projection onto screen 12 the operator can select a radius of curvature so that the innermost projected concentric ring 48 overlies ring number 1 of the target rings 14. By noting this measurement and then by noting the radius actually selected for the lens the total clearance of the pupil area of the selected contact lens can be predicted.

Figure 2:
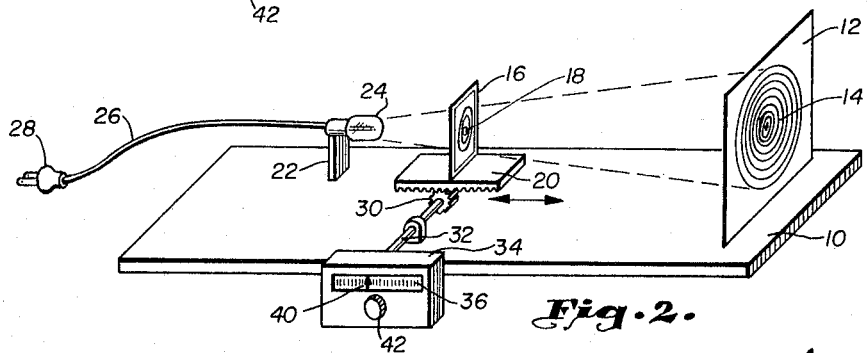
FIGURE 2 is a schematic view of an alternate embodiment of the device of this invention.
Figure 4:
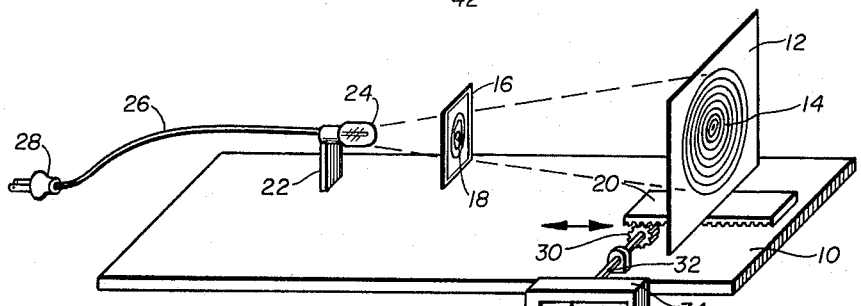
FIGURE 4 is a third alternate embodiment of the device of this invention.

The device of FIGURE 1 is merely illustrative of an embodiment of this invention. In FIGURE 1 variable magnification is obtained as the light source 21 is varied in distance from the photographic holder 16. FIGURE 2 shows an alternate embodiment wherein the photographic holder is variable relative to the light source 24. FIGURE 4 shows an arrangement wherein the screen is variable relative to the photographic holder 16. All of these work in the same manner to vary the magnification of the projected view relative to the target 14. It may seem that all of these are substantially identical in application and the method of calibration.

Figure 3:
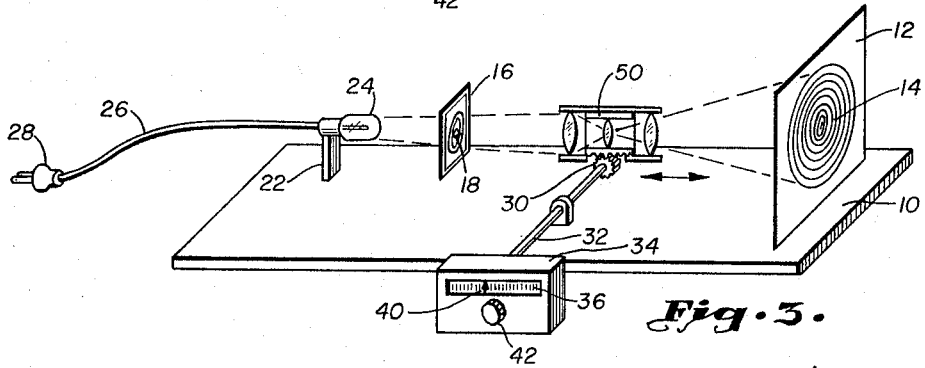
FIGURE 3 is a second alternate embodiment of the device of this invention.

FIGURE 3 shows an additional alternate embodiment wherein the light source 24, photographic holder 16 and screen 12 are all at a fixed distance. A magnifying lens 50 of the variable magnification type is interposed between the photographic holder 16 and the screen 12. The lens system 50 is in turn connected with the calibrating indicator 34 to function in the same manner as previously described. In FIGURE 3 the lens system 50 is of the type wherein the magnification of the projected image can be varied while at the same time maintaining proper focus.

While the use of concentric rings of light has been set forth herein as the preferred embodiment it can be seen that the same results are accomplished by the use of other geometric arrangement of lines. A grid of parallel lines superimposed on a grid of similar but perpendicular parallel lines will suffice to produce satisfactory results under the principles of this invention. Where the term "concentric" is used it means any preselected geometrical arrangement of lines.

Although this invention has been described with a certain degree of particularity it is manifest that many changes may be made in the details of construction and the arrangement of components without departing from the spirit and scope of this disclosure.

What is claimed:

1. A method of predetermining the points of contact of a contact lens of given diameter and radius of curvature with the exterior corneal surface of an eyeball comprising:
    displaying on a screen a target having the form derived from the reflection of concentric light rings from a reflective spherical surface of known radius;
    displaying on said screen projected concentric light rings reflected from the exterior corneal surface of the eyeball;
    varying the relative magnification of said target and said projected light rings reflected from the eyeball so that said target displays concentric rings of light as would be reflected from a spherical reflective surface of the given radius of curvature of said contact lens; and
    visually determining the points wherein the rings of said target overly corresponding rings of light displayed on said screen as reflected from the eyeball.

2. A device for visually illustrating the radius of curvature of the exterior corneal surface of an eyeball comprising:
    a screen having a target imprinted thereon, the target having the form derived from the reflection of concentric light rings from a spherical reflective surface of known radius;
    a light source positioned to cast light on said screen;
    a photograph holder supported in a plane parallel the said screen and between said screen and said light source;
    a photographic negative of reflected concentric light rings from the exterior corneal surface of an eyeball held by said photograph holder whereby the rings of said photographic negative are projected onto said target imprinted screen;
    means of moveably positioning one of said screen, said light source and said photograph holder relative to the other two of such members to vary the effective radius of the spherical reflective surface represented by said target imprinted on said screen; and
    indicating means with the moveable member to visually and calibratingly indicate the distance of the moveable member from the other of said members to provide a visual comparison of the relationship of a spherical surface of variable known radius to the exterior corneal surface from which said photographic negative is made.

3. A device for presenting a visual comparison of two different reflective curved surfaces comprising:
    a screen having a target imprinted thereon, the target having the form derived from the reflection of concentric light rings from a first curved surface;
    a light source moveably supported relative to said screen arranged to cast light on said screen;
    a photograph holder supported in a plane parallel the said screen and between said screen and said light source;
    a photographic negative of reflected concentric light rings from a second reflective curved surface held by said photograph holder whereby the rings on said photographic negative are projected onto said screen;
    means of moveably positioning said light source relative to said photograph holder whereby the magnification of the projection onto said screen may be varied to vary the effective relative radii of the curvature of the curved surfaces represented by the projection of said photographic negative and said target; and
    means responsive to the distance between said light source and said photograph holder to calibratingly indicate the magnification of projection of said second curved surface light rings on said screen providing a visual comparison of the curved surfaces represented by said target and projected photographic negative under variable known radii of curvature relationship.

4. A device for presenting a visual comparison of two different reflective curved surfaces comprising:
    a screen having a target imprinted thereon, the target having the form derived from the reflection of concentric light rings from a first curved surface;
    a light source positioned at a fixed distance from said screen arranged to cast light on said screen;
    a photograph holder supported in a plane parallel the said screen and between said light source and said screen;
    a photographic negative of reflected concentric light rings from a second reflective curved surface held by said photograph holder whereby the rings on said photographic negative are projected onto said screen, said photograph holder being moveable relative to said screen;
    means of moveably positioning said photograph holder relative to said screen whereby the magnification of the projection onto said screen may be varied to vary the effective relative radii of curvature of the curved surfaces represented by the projection of said photographic negative and said target; and
    means responsive to the distance between said photograph holder and said screen to calibratingly indicate the magnification of projection of said second curved surface light rings on said screen providing a visual comparison of the curved surfaces represented by said target and the projected photographic negative under variable known radii of curvature relationships.

5. A device for presenting a visual comparison of two different reflective curved surfaces comprising:
    a moveably supported screen having a target imprinted thereon, the target having the form derived from the reflection of concentric light rings from a first curved surface;
    a light source positioned to radiate light onto said screen;
    a photograph holder supported in a plane parallel said screen and between said light source and said screen;
    a photographic negative of reflected concentric light rings from a second reflective curved surface held by said photograph holder whereby the rings on said photographic negative are projected onto said screen, said photographic negative holder being supported at a fixed position;

means of moveably positioning said screen relative to said photograph holder whereby the magnification of the projection onto said screen may be varied to vary the effective relative radii of curvature of the curved surface represented by the projection of said photographic negative on said screen and said target; and means responsive to the distance between said screen and said photograph holder to calibratingly indicate the magnification of projection of said second curved surface light rings on said screen providing a visual comparison of the curved surfaces represented by said target and the projected photographic negative under variable known radii of curvature relationships.

6. A device for presenting a visual comparison of two different reflective curved surfaces comprising:

a screen having a target imprinted thereon, the target having the form derived from the reflection of concentric light rings from a first curved source;

a light source positioned at a fixed distance from said screen positioned to radiate light onto said screen;

a photograph holder supported in a plane parallel the said screen and between said light source and said screen and at a fixed distance from said screen;

a photographic negative of reflected concentric light rings from a second reflective curved surface held by said photograph holder whereby the rings on said photographic negative are projected onto said screen;

an optical variable magnification means supported between said photograph holder and said screen whereby the magnification of the projection onto said screen may be varied to vary the effective relative radii of curvature of the curved surfaces represented by the projection of said photographic negative on said screen and said target; and means responsive to the variable magnification means to calibratingly indicate the magnification of projection of said second curved surface light rings on said screen providing a visual comparison of the curved surfaces represented by said target and projected photographic negative under variable known radii of curvature relationships.

References Cited by the Examiner
UNITED STATES PATENTS

| | | | |
|---|---|---|---|
| 2,264,080 | 11/1941 | Hunter. | |
| 2,518,685 | 9/1950 | Harrison | 88—24 |
| 2,628,528 | 2/1953 | Dietrich et al. | 88—24 |
| 2,780,956 | 2/1957 | Fuller et al. | 88—24 |
| 3,169,459 | 2/1965 | Friedberg et al. | 88—14 X |
| 3,171,883 | 3/1965 | Jones | 88—14 X |

NORTON ANSHER, *Primary Examiner.*

V. A. SMITH, *Assistant Examiner.*